No. 704,763. Patented July 15, 1902.
J. SEYMOUR.
MACHINE FOR MIXING GAS AND AIR.
(Application filed Dec. 9, 1901.)
(No Model.) 4 Sheets—Sheet 1.
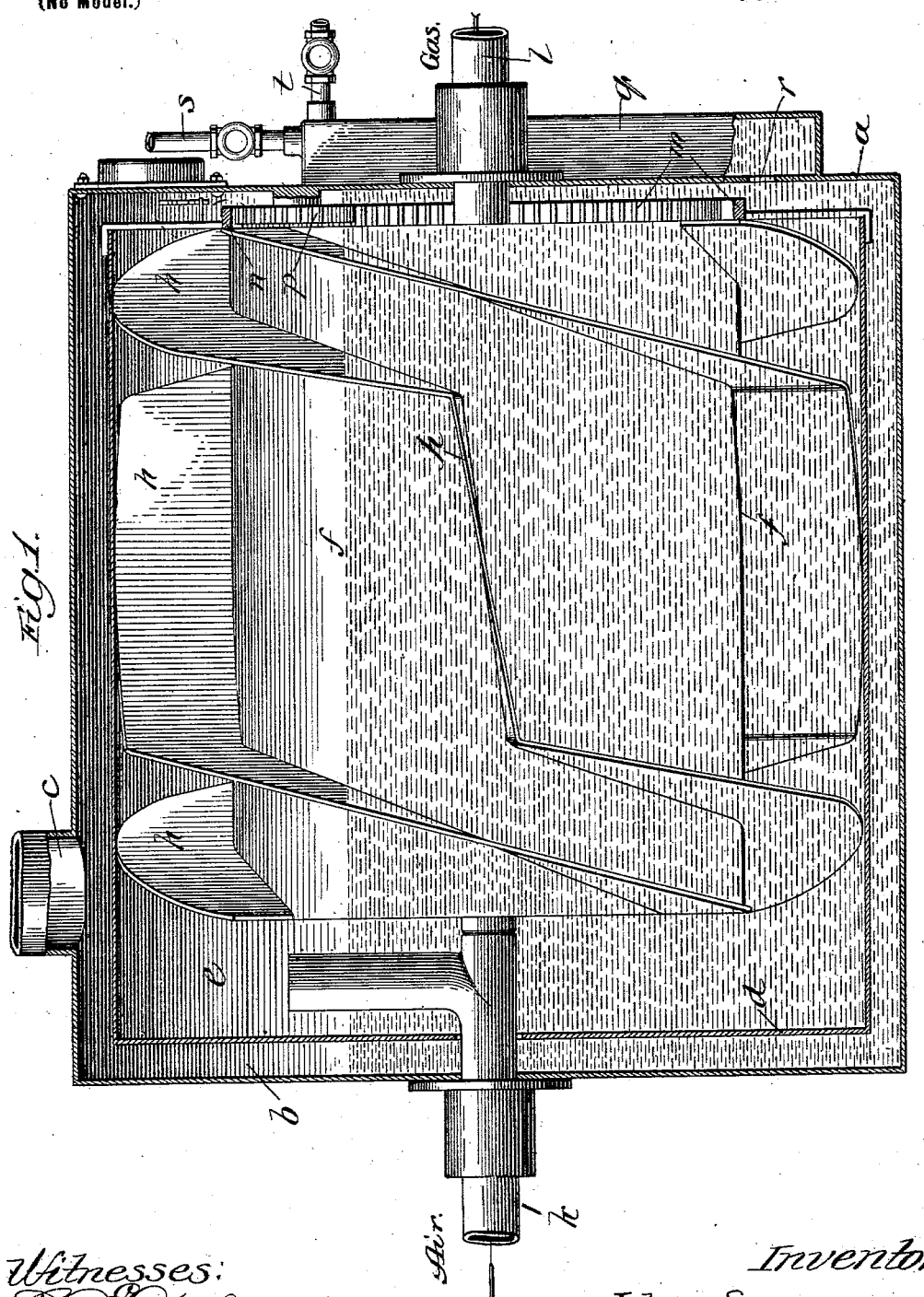
Witnesses:
Inventor:
John Seymour,
By Thomas F. Sheridan,
Atty.

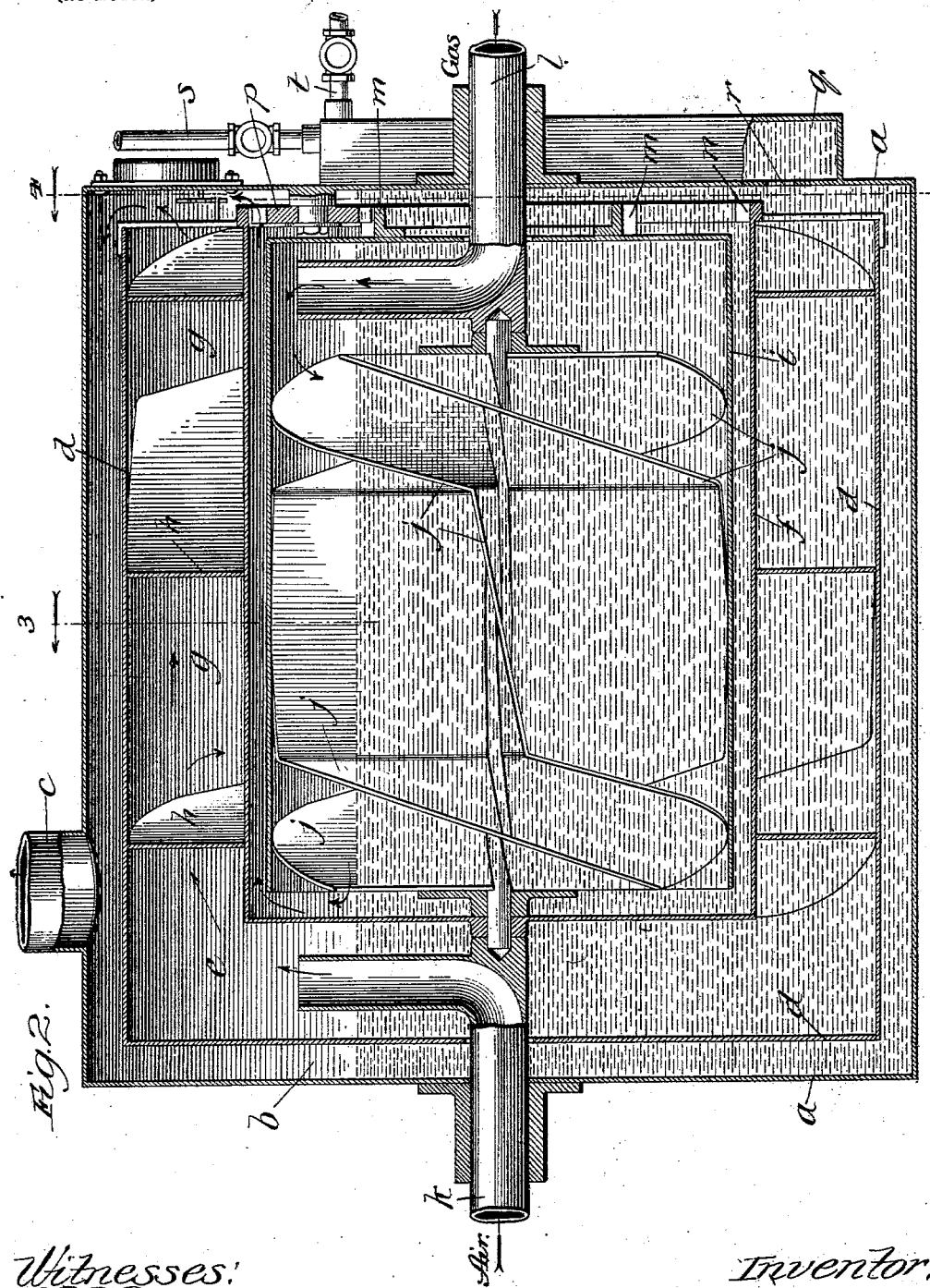

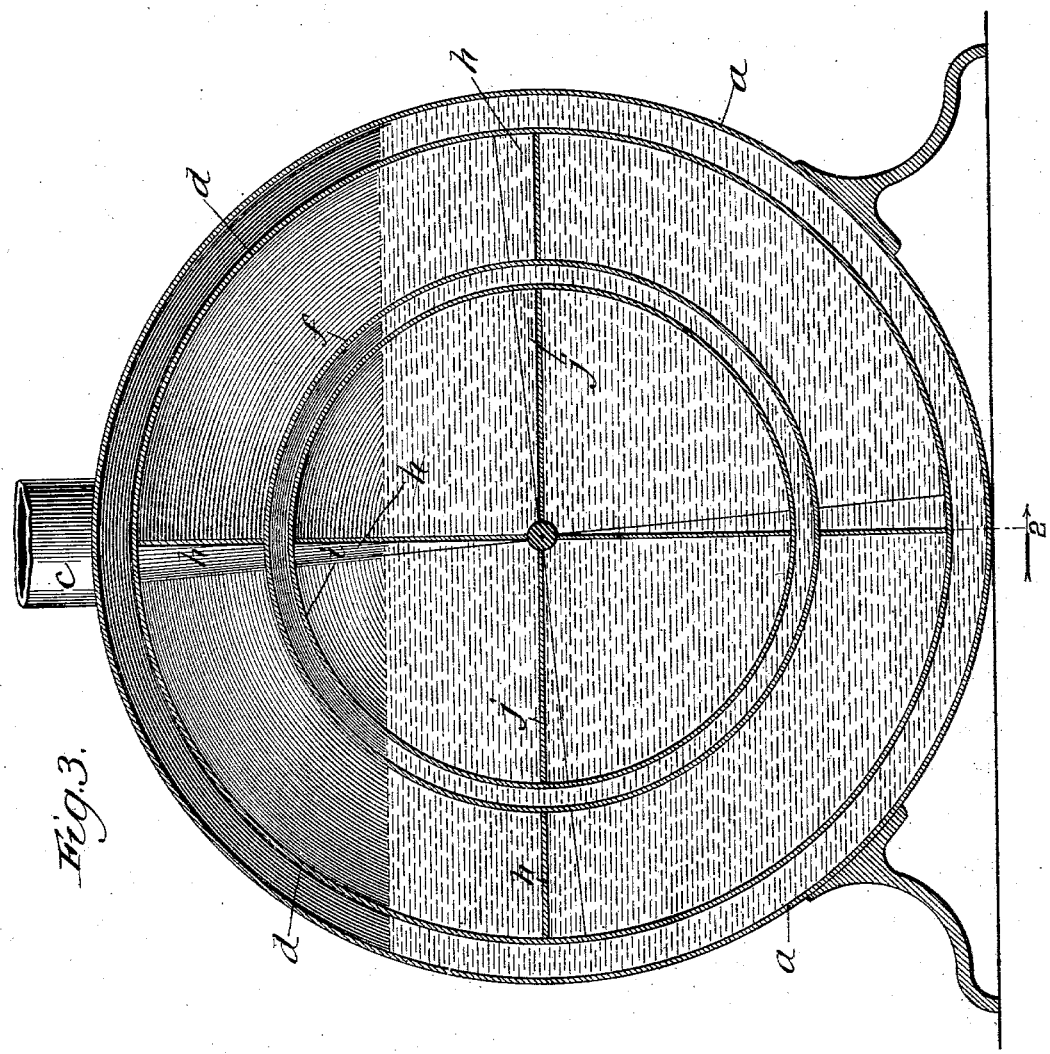

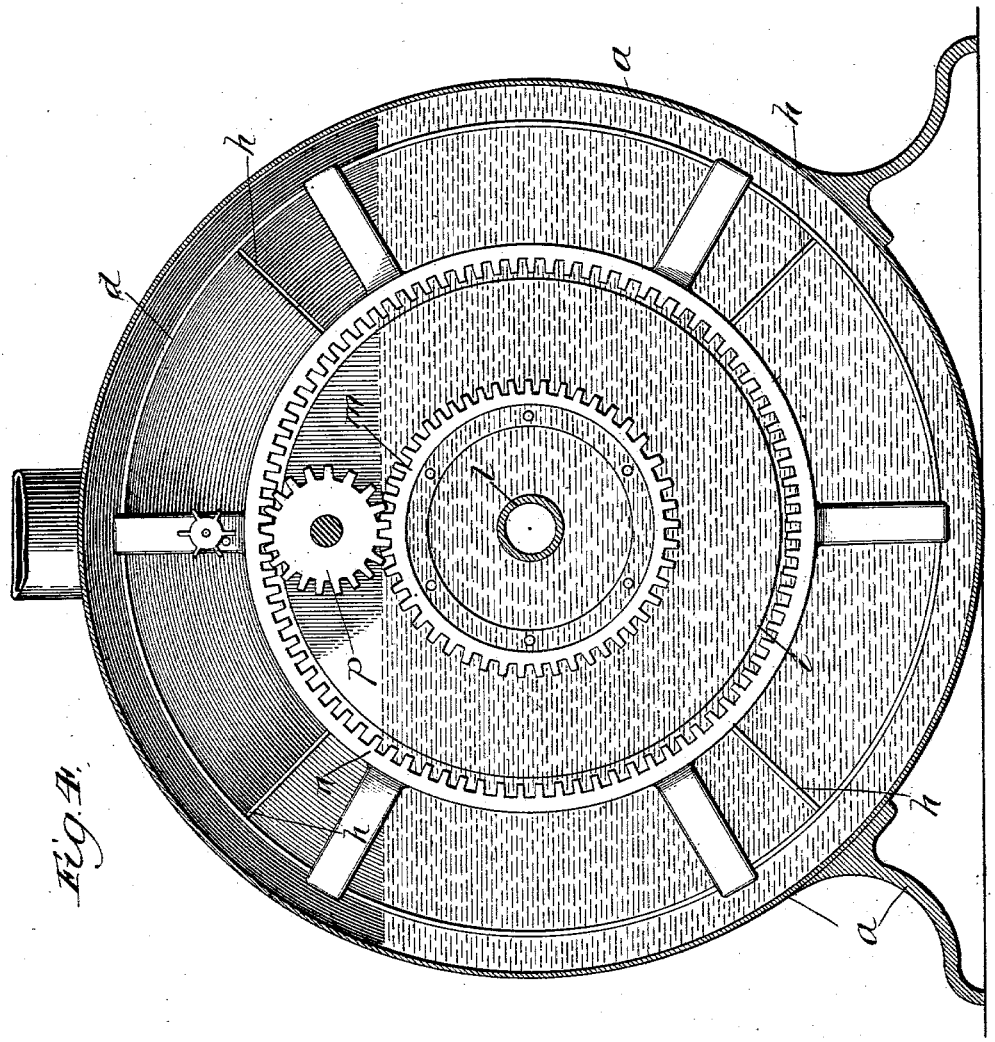

UNITED STATES PATENT OFFICE.

JOHN SEYMOUR, OF TORONTO, CANADA.

MACHINE FOR MIXING GAS AND AIR.

SPECIFICATION forming part of Letters Patent No. 704,763, dated July 15, 1902.

Application filed December 9, 1901. Serial No. 85,288. (No model.)

*To all whom it may concern:*

Be it known that I, JOHN SEYMOUR, a subject of the King of Great Britain, residing at Toronto, in the Province of Ontario, Dominion of Canada, have invented certain new and useful Improvements in Machines for Mixing Air with Gas, of which the following is a specification.

This invention relates to that class of machines which is arranged to measure air and gas in the desired quantities and thoroughly mix the same in the required proportions, and particularly to the construction and operation of the mechanisms by which this result is obtained, all of which will more fully hereinafter appear.

The principal object of this invention is to provide a simple, economical, and efficient machine with means for measuring air and gas and mixing the same in desired quantities and proportions.

A further object is to provide a machine with two movable parts—one for measuring air and the other for measuring gas, and to mix the said gases in an economical manner.

Further objects will appear from an examination of the drawings and the following description and claims.

The invention consists principally in the combination of an outer casing provided with a liquid-sealing chamber and two movable parts arranged therein—one for measuring air and one for measuring gas, and arranged by their coöperation to assist in thoroughly mixing the same.

The invention consists, further, in the combination of a receptacle providing a liquid-sealing chamber and two concentric rotatable cylinders—one for measuring air and the other for measuring gas, and arranged by their coöperation to assist in thoroughly mixing the gas.

The invention consists, further, in the combination of an exterior receptacle providing a mixture-exhaust and liquid-sealing chamber and two interior concentric cylindrical receptacles arranged one within the other and provided with helical measuring-chambers—one for measuring air and the other for measuring gas, and arranged by their coöperation to thoroughly mix such gases.

The invention consists, further, in the combination of an exterior receptacle providing a mixture-exhaust and liquid-sealing chamber, two concentric cylindrical receptacles provided with peripheral helical air and gas measuring chambers, respectively, geared together so as to rotate simultaneously, means for feeding air to the chambers of the exterior cylinder, and means for feeding gas to the chambers of the interior cylinder to assist in thoroughly mixing such gases during the coöperation of the parts.

The invention consists, further, in the combination of an exterior casing providing a mixture-exhaust and liquid-sealing chamber, an outer cylindrical receptacle provided with a series of substantially helical measuring-chambers for air and communicating at one end with the exhaust-chamber, a concentric inner cylinder provided with a series of helical measuring-chambers open at one end to the exhaust-chamber, gear mechanism connecting both cylinders together, means for feeding gas to the inner cylinder to rotate the same and by which it is measured, and means for feeding air to the other cylinder, the parts being arranged to coöperate and mix the two gases together.

The invention consists, further and finally, in the features, combinations, and details of construction hereinafter described and claimed.

In the accompanying drawings, Figure 1 is an elevation, partly in section, taken through the longitudinal center of the machine; Fig. 2, a vertical sectional elevation taken on line 2 of Fig. 3 looking in the direction of the arrow; Fig. 3, a cross-sectional elevation taken on line 3 of Fig. 2 looking in the direction of the arrow, and Fig. 4 a similar view taken on line 4 of Fig. 2 looking in the direction of the arrow.

In constructing a machine in accordance with these improvements I provide an exterior casing $a$ of the desired size, shape, and strength to hold and sustain the operative and other parts in position for use. This part, as shown particularly in Figs. 3 and 4, is substantially cylindrical in contour when viewed in cross-sectional or end elevations and may be provided with a base or other supporting portion to sustain it in operative position and condition. This casing forms what I prefer to term an "exterior" receptacle, providing an interior chamber $b$, which, as above suggested, acts as a liquid-sealing chamber in the lower portion and as a mixture-exhaust chamber in the upper portion—that is, a chamber in which the mixture of the gas and air is held for a time before being drawn off through the exhaust-pipe $c$ for consumption and use.

To measure the quantity of air desired for use, I provide an outer rotatable cylinder portion $d$, which is provided at one end with an air-supply chamber $e$ and at the same time has a liquid seal formed by the liquid in the lower portion thereof, which liquid extends through each and every chamber of the entire apparatus. This cylinder is provided with an inner cylindrical wall $f$, between which and the outer cylindrical wall is arranged a series of helical air-measuring chambers $g$, formed by the blades or helical partitions $h$ and arranged in series around the periphery thereof, as shown particularly in Figs. 1 and 3. One end of each of these helical air-measuring chambers is open to the air-supply and liquid-sealing chamber $e$, and the other end of the cylinder being opened it is naturally connected with or has communication with the mixture-exhaust chamber $b$.

To measure gas in the desired quantities, a second or inner concentric rotatable cylinder $i$ is provided, having a series of helical chambers formed by the blades $j$ and which at one end—and the upper portion thereof—forms a gas-supply chamber and at the lower portion a liquid-sealing chamber, which seal forces the gas forward during the rotation of the parts. The other end is opened to the interior of the outer air-measuring cylinder, so that the gas as it passes out therethrough flows in the direction indicated by the "legends" and back and out through the open end of such air-cylinder and into the mixture-exhaust chamber, where it is mixed with the air as such air is forced into the exhaust-chamber. The supply end of the air-chamber $e$ is provided with an air-supply pipe $k$, which has its opening above the liquid seal, as shown in Fig. 2, and the supply end of the gas-chamber is provided with a gas-supply pipe $l$, opening into such chamber above the liquid seal. As the gas is fed in under the desired pressure to the gas-supply chamber the inner rotatable cylinder, being pivoted, as shown in Fig. 2 of the drawings, in the walls of the air and gas supply pipes, is free to rotate by the action of the gas impinging against the blades thereof. This action is controlled entirely by the pressure and velocity of the gas which is driven through such chamber and measured as it is being forced therethrough, the liquid seal acting to prevent its return and not permitting it to leave such chamber until its outlet is raised above the liquid seal.

It is highly desirable that some means be arranged to rotate the outer cylinder during the rotation of the parts, and in order to accomplish this result coincident with the revolutions of the inner cylinder such inner cylinder is provided with a spur-gear $m$ and the outer cylinder with an internal annular gear $n$, while an intermediate spur-pinion $p$, rotatably mounted on the walls of the exterior receptacle, meshes with both of these gears and transmits power and motion from one to the other, thus insuring the desired rotation of the outer cylinder simultaneously with that of the inner cylinder and at the desired rate of speed. The exterior receptacle is provided with a water-box $q$, communicating with the inner chambers by means of the perforations $r$ in the exterior casing $a$ and through the openings in the ends of both rotatable cylinders. This water-box is also provided with a water-supply pipe $s$ and an overflow-pipe $t$, insuring the desired supply of water and the maintaining of the desired level of the liquid seal in all of the chambers.

In operation the gas is furnished through the gas-supply pipe into the gas-supply chamber of the interior receptacle, impinging against the helical blades to rotate the same in such a manner as to feed the gas through the helical chambers thereof at the desired rates of speed and to measure the desired quantity. At the same time the rotation of the exterior cylinder takes place, which, with its helical blades, cuts the desired quantity of air, measures it in the helical chambers, and forces it into the exhaust-chamber, where it is brought into intimate contact and forms a mixture with the gas and from which it may be withdrawn through the exhaust-pipe $c$. The rate of rotation of these parts and of the operation of the machine will be entirely dependent on the gas-supply. If the supply of gas be turned off entirely, the machine will stop operating. If but a small quantity of gas be supplied, the machine will operate very slowly, while if a large quantity of gas be supplied the machine will operate very fast, being regulated, of course, by the pressure in the exhaust-chamber, which in turn is controlled by the amount which is drawn off for consumption or demand, all of which will be understood by those skilled in the art.

I claim—

1. In a machine of the class described, the combination of an outer casing, and two movable parts arranged therein and forming two chambers one within the other—one for measuring air and one for measuring gas, arranged by their coöperation to assist in thoroughly mixing the same, substantially as described.

2. In a machine of the class described, the combination of an outer casing provided with a liquid-sealing chamber, and two movable parts arranged therein and forming two chambers one within the other—one for measuring air and one for measuring gas, arranged by their coöperation to assist in thoroughly mixing the same, means for admitting gas under pressure into the chamber of one of such movable parts to measure such gas and cause such part to rotate, and means for connecting such two movable parts, whereby when one is rotated the other is operated, substantially as described.

3. In a machine of the class described, the combination of a receptacle providing a liquid-sealing chamber, and two concentric rotatable cylinders—one for measuring air and the other for measuring gas and arranged by their coöperation to assist in thoroughly mixing the gas, substantially as described.

4. In a machine of the class described, the combination of an exterior receptacle providing a mixture-exhaust and liquid-sealing chamber, and two interior concentric cylindrical receptacles arranged one within the other and provided with helical measuring-chambers—one for measuring air and the other for measuring gas and arranged by their coöperation to thoroughly mix such gases, substantially as described.

5. In a machine of the class described, the combination of an exterior receptacle providing a mixture-exhaust and liquid-sealing chamber, two concentric cylindrical receptacles provided with peripheral helical measuring-chambers geared together so as to rotate simultaneously to thoroughly mix air and gas during the coöperation of the parts, means for feeding air to the chambers of the exterior cylinder, and means for feeding gas to the chambers of the interior cylinder, substantially as described.

6. In a machine of the class described, the combination of an exterior casing providing a mixture-exhaust and liquid-sealing chamber, an outer cylindrical receptacle provided with a series of substantially helical measuring-chambers for air and communicating at one end with the exhaust-chamber, a concentric inner cylinder provided with a series of helical measuring-chambers open at one end to the exhaust-chamber, gear mechanism connecting both cylinders together, means for feeding gas to the inner cylinder to rotate the same and by which it is measured, and means for feeding air to the other or outer cylinder, the parts being arranged to coöperate and mix the two gases together, substantially as described.

7. In a machine of the class described, the combination of an exterior casing provided with a mixture-exhaust and liquid-sealing chamber, an outer cylinder having one closed end formed of two concentric walls between the ends of which is arranged an air and liquid sealing chamber and between the concentric walls of which is arranged a series of helical air-measuring chambers opening into the exhaust-chamber, an inner concentric cylinder provided with an outer cylindrical wall and closed at one end to form a gas-supply chamber and provided with a plurality of helical blades forming a series of helical measuring-chambers, a fixed pipe entering the air and liquid chamber above the liquid seal of the outer cylinder upon which one end of both cylinders is rotatably mounted, a fixed pipe entering the gas-supply chamber of the inner cylinder upon which the other end of the inner cylinder is loosely and rotatably mounted, and an exhaust-pipe for the exhaust-chamber of the outer receptacle, substantially as described.

8. In a machine of the class described, the combination of an exterior casing provided with a mixture-exhaust and liquid-sealing chamber, an outer cylinder having one closed end and two concentric walls between the ends of which is arranged an air and liquid-sealing chamber and between the concentric walls of which is arranged a series of helical air-measuring chambers opening into the exhaust-chamber, an inner concentric cylinder provided with an outer cylindrical wall and closed at one end to form a gas-supply chamber and provided with a plurality of helical blades forming a series of helical measuring-chambers, a fixed pipe entering the air and liquid chamber above the liquid seal of the outer cylinder upon which one end of both cylinders is rotatably mounted, a fixed pipe entering the gas-supply chamber of the inner cylinder upon which the other end of the inner cylinder is loosely and rotatably mounted, an exhaust-pipe for the exhaust-chamber of the outer receptacle, a liquid-supply box secured to the main receptacle and having communication with the liquid-sealing portion thereof, and supply and overflow pipes on such box, substantially as described.

JOHN SEYMOUR.

Witnesses:
   THOMAS F. SHERIDAN,
   ANNIE C. COURTENAY.